(12) United States Patent
Cui

(10) Patent No.: US 11,210,014 B2
(45) Date of Patent: Dec. 28, 2021

(54) METHOD AND APPARATUS FOR PROCESSING I/O INFORMATION OF DATA, METHOD AND APPARATUS FOR ANALYZING I/O INFORMATION OF DATA, AND RELATED DEVICES

(71) Applicant: BEIJING BAIDU NETCOM SCIENCE AND TECHNOLOGY CO., LTD., Beijing (CN)

(72) Inventor: Jiacheng Cui, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 19 days.

(21) Appl. No.: 16/866,423

(22) Filed: May 4, 2020

(65) Prior Publication Data

US 2020/0379671 A1 Dec. 3, 2020

(30) Foreign Application Priority Data

May 30, 2019 (CN) .......................... 201910463849.5

(51) Int. Cl.
G06F 12/00 (2006.01)
G06F 3/06 (2006.01)
G06F 9/4401 (2018.01)
G06F 11/36 (2006.01)

(52) U.S. Cl.
CPC ............ *G06F 3/0653* (2013.01); *G06F 3/061* (2013.01); *G06F 3/067* (2013.01); *G06F 3/0614* (2013.01); *G06F 3/0631* (2013.01); *G06F 9/4418* (2013.01); *G06F 11/3636* (2013.01)

(58) Field of Classification Search
None
See application file for complete search history.

(56) References Cited

U.S. PATENT DOCUMENTS

2016/0283129 A1* 9/2016 Wang .................... G06F 3/0685
2017/0104663 A1* 4/2017 Thakur .................. G06F 3/067

* cited by examiner

*Primary Examiner* — Daniel D Tsui
(74) *Attorney, Agent, or Firm* — Lathrop GPM LLP

(57) ABSTRACT

Embodiments of the present disclosure provide a method and an apparatus for processing I/O information of data, a method and an apparatus for analyzing I/O information of data, and related devices. The method includes: collecting I/O information of data in a storage engine by a process independent of the storage engine in a storage node; performing adjustment on the process in response to monitoring that a variation in usage of resource in the storage node exceeds a threshold, the adjustment being used to decrease a resource occupancy of the process; and sending the I/O information collected by the process to a target node, to enable the target node to analyze the I/O information. Embodiments of the present disclosure may reduce the complexity of the storage node, and avoid adding a load to the storage engine.

16 Claims, 4 Drawing Sheets collecting I/O information of data in a storage engine by a process independent of the storage engine in a storage node — 101 performing adjustment on the process in response to monitoring that a variation in usage of resource in the storage node exceeds a threshold — 102 sending the I/O information collected by the process to a target node, to enable the target node to analyze the I/O information — 103

METHOD AND APPARATUS FOR PROCESSING I/O INFORMATION OF DATA, METHOD AND APPARATUS FOR ANALYZING I/O INFORMATION OF DATA, AND RELATED DEVICES

CROSS-REFERENCE TO RELATED APPLICATION

This application claims priority to and benefits of Chinese Patent Application Serial No. 201910463849.5 filed with the State Intellectual Property Office of P. R. China on May 30, 2019, the entire content of which is incorporated herein by reference.

FIELD

The present disclosure relates to a field of Internet technologies, and more particularly to a method and an apparatus for processing I/O information of data, a method and an apparatus for analyzing I/O information of data, and related devices.

BACKGROUND

Presently, data storage supports a distributed mass data storage system. The storage system includes a plurality of distributed storage nodes, and each storage node has an independent storage engine. In addition, in order to improve a cache effect in a distributed storage technology, there is a need to collect and analyze I/O (read and write) information of data in the storage node. For example, the I/O information such as an access mode, an access heat and a life period of the data is collected, the collected I/O information is analyzed to obtain quantitative data, and then a targeted design is performed to improve the cache effect. However, presently, functions of collecting and analyzing are integrated into an architecture of the storage engine in each storage node. In this way, there is a need to improve the architecture of the storage engine, and to add collection codes to all I/O processes in the system, thereby causing a high complexity of the storage node.

SUMMARY

Embodiments of the present disclosure provide a method and an apparatus for processing I/O information of data, a method and an apparatus for analyzing I/O information of data, and related devices, to solve a problem that a storage node has a high complexity.

In a first aspect, embodiments of the present disclosure provide a method for processing I/O information of data. The method includes: collecting I/O information of data in a storage engine by a process independent of the storage engine in a storage node; performing adjustment on the process in response to monitoring that a variation in usage of resource in the storage node exceeds a threshold, in which the adjustment is used to decrease a resource occupancy of the process; and sending the I/O information collected by the process to a target node, to enable the target node to analyze the I/O information.

Alternatively, sending the I/O information collected by the process to the target node includes: compressing the I/O information collected by the process into a compressed file, and sending the compressed file to the target node.

Alternatively, performing the adjustment on the process includes: suspending the process, and recording a breakpoint data file. The method further includes: collecting the I/O information continuously by the process based on the breakpoint data file.

Alternatively, collecting the I/O information continuously by the process based on the breakpoint data file includes: collecting the I/O information continuously by the process based on the breakpoint data file when a timer expires, in which the timer is started when the process is suspended.

In a second aspect, embodiments of the present disclosure provide a method for analyzing I/O information of data. The method includes: receiving I/O information of data sent by a plurality of storage nodes; when the I/O information includes I/O information in different formats, converting the I/O information in different formats into I/O information in a unified format; and analyzing the I/O information in the unified format.

Alternatively, when the I/O information includes the I/O information in different formats, converting the I/O information in different formats into the I/O information in the unified format includes: when the I/O information includes I/O information in a plurality of compression formats, reading the I/O information in the plurality of compression formats respectively, and converting the read I/O information into the I/O information in the unified format.

In a third aspect, embodiments of the present disclosure provide an apparatus for processing I/O information of data. The apparatus includes: a first collecting module, an adjusting module, and a sending module. The first collecting module is configured to collect I/O information of data in a storage engine by a process independent of the storage engine in a storage node. The adjusting module is configured to perform adjustment on the process in response to monitoring that a variation in usage of resource in the storage node exceeds a threshold, in which the adjustment is used to decrease a resource occupancy of the process. The sending module is configured to send the I/O information collected by the process to a target node, to enable the target node to analyze the I/O information.

Alternatively, the sending module is configured to compress the I/O information collected by the process into a compressed file, and to send the compressed file to the target node.

Alternatively, the adjusting module is configured to suspend the process in response to monitoring that the variation in usage of the resource in the storage node exceeds the threshold, and to record a breakpoint data file. The apparatus further includes: a second collecting module, configured to collect the I/O information continuously by the process based on the breakpoint data file.

Alternatively, the second collecting module is configured to collect the I/O information continuously by the process based on the breakpoint data file when a timer expires, in which, the timer is started when the process is suspended.

In a fourth aspect, embodiments of the present disclosure further provide an apparatus for analyzing data I/O information. The apparatus includes: a receiving module, a converting module, and an analyzing module. The receiving module is configured to receive I/O information of data sent by a plurality of storage nodes. The converting module is configured to, when the I/O information includes I/O information in different formats, convert the I/O information in different formats into I/O information in a unified format. The analyzing module is configured to analyze the I/O information in the unified format.

Alternatively, the converting module is configured to, when the I/O information includes I/O information in a plurality of compression formats, read the I/O information in the plurality of compression formats respectively, and convert the read I/O information into the I/O information in the unified format.

In a fifth aspect, embodiments of the present disclosure further provide a storage device. The storage device includes a processor; a memory; and a computer program stored in the memory and executable by the processor. When the computer program is executed by the processor, the method for processing I/O information of data according to embodiments of the present disclosure is implemented.

In a sixth aspect, embodiments of the present disclosure further provide an intelligent device. The intelligent device includes a processor; a memory; and a computer program stored in the memory and executable by the processor. When the computer program is executed by the processor, the method for analyzing I/O information of data according to embodiments of the present disclosure is implemented.

In a seventh aspect, embodiments of the present disclosure further provide a computer readable storage medium. The computer readable storage medium has a computer program stored thereon. When the computer program is executed by a processor, the method for processing I/O information of data according to embodiments of the present disclosure is implemented, or the method for analyzing I/O information of data according to embodiments of the present disclosure is implemented.

In embodiments of the present disclosure, the I/O information of data in the storage engine is collected by the process independent of the storage engine in the storage node, the adjustment is performed on the process in response to monitoring that the variation in usage of the resource in the storage node exceeds the threshold, in which, the adjustment is used to decrease the resource occupancy of the process, and the I/O information collected by the process is sent to the target node, to enable the target node to analyze the I/O information. In this way, the I/O information is collected by the above process, and the collected I/O information is sent to the target node for analysis, thereby reducing the complexity of the storage node.

BRIEF DESCRIPTION OF THE DRAWINGS

In order to describe the technical solution of embodiments of the present disclosure more clearly, accompanying drawings used in the description for embodiments of the present disclosure are introduced briefly below. The accompanying drawings below are merely some embodiments of the present disclosure. For the skilled in the art, other accompanying drawings may also be obtained according to those accompanying drawings without any creative labor.

DETAILED DESCRIPTION

The technical solution in embodiments of the present disclosure is described clearly and completely below with reference to accompanying drawings in embodiments of the present disclosure. The embodiments described are only some embodiments of the present disclosure, and are not all of embodiments. Based on embodiments of the present disclosure, all other embodiments obtained by the skilled in the art without any creative labor are within the protection scope of the present disclosure.

The term "including" and any variations thereof in the specification and claims of the present disclosure are intended to cover a non-exclusive inclusion. For example, a process, method, system, product, or apparatus that includes a series of steps or units is not limited to those steps or units explicitly listed, but may include other steps or units not explicitly listed or inherent to such process, method, product, or apparatus. In addition, using for terms "and/or" in the specification and the claims represents at least one of the coupled objects. For example, A and/or B represents that there are three situations including A alone, B alone, and A and B.

In embodiments of the present disclosure, the term "exemplary", "for example" or the like is used to represent examples or illustrations. Any embodiment or design solution described as "exemplary" or "for example" in embodiments of the present disclosure should not be construed as more preferred or advantageous than other embodiments or design solutions. Specifically, using the term such as "exemplary" or "for example" is intended to present related concepts in a detailed way.

Figure 1:
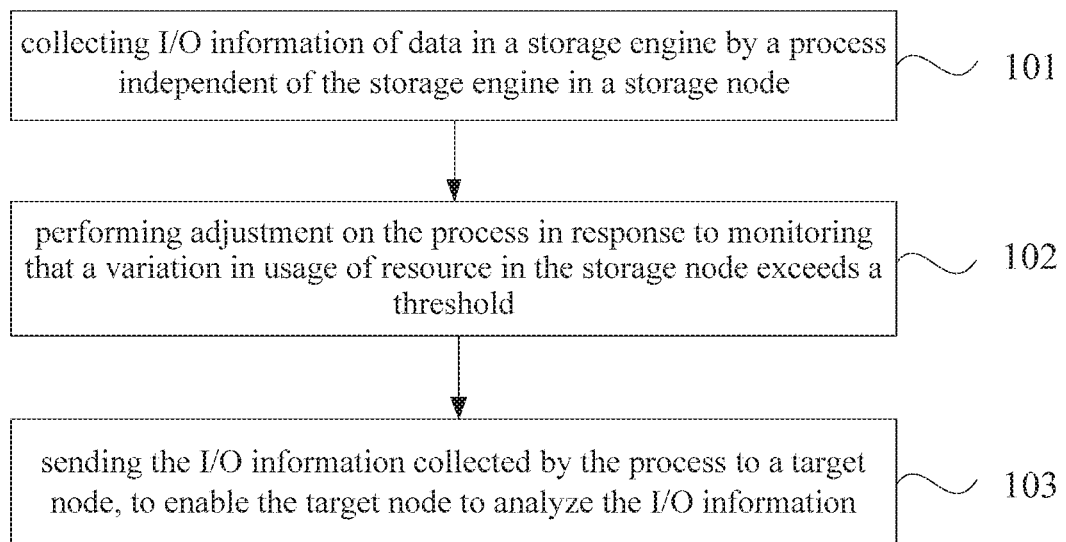
FIG. 1 is a flow chart illustrating a method for processing I/O information of data according to an embodiment of the present disclosure.

Referring to FIG. 1, FIG. 1 is a flow chart illustrating a method for processing I/O information of data according to an embodiment of the present disclosure. As illustrated in FIG. 1, the method includes the following.

At block 101, I/O information of data in a storage engine is collected by a process independent of the storage engine in a storage node.

The above process independent of the storage engine may be understood that the process and the storage engine are independent or decoupled from each other.

Collecting the I/O information of data in the storage engine may include, but not be limited to, collecting at least one of: an access mode, an access heat and a life period of the data in the storage engine.

In other words, in embodiments of the present disclosure, the I/O information of the data may include, but be not limited to at least one of: the access mode, the access heat and the life period of the data. Different I/O information may be collected based on an analysis requirement, which is not limited in embodiments of the present disclosure.

At block 102, adjustment is performed on the process in response to monitoring that a variation in usage of resource in the storage node exceeds a threshold. The adjustment is used to decrease a resource occupancy of the process.

The variation in usage of the resource may include, but be not limited to, a variation in usage of at least one of: a CPU (central processing unit), a memory, a disk I/O, a disk free space, a network card bandwidth and a system load.

When two or more resources above are included, and the variation in usage of any one resource in the two or more resources exceeds the threshold, the process may be adjusted.

Further, embodiments of the present disclosure may periodically monitor the resource in the storage node, and the variation in usage of the resource exceeding the threshold may be that a variation in usage of the resource monitored in one or more periods exceeds the threshold.

The above adjustment may be an adjustment that may reduce the resource occupation of the process, such as reducing the number of collection tasks of the process, suspending the collection. The resource occupation here may be the occupation of one or more of the CPU, the memory, the disk I/O, the disk free space, the network card bandwidth and the system load.

Through actions at block 102, a resource consumption of the process on the storage node may be controlled, thereby avoiding or reducing influence of the process on the storage engine.

As an alternative implementation, performing the adjustment on the process includes: suspending the process, and recording a breakpoint data file. The method further includes: collecting the I/O information continuously by the process based on the breakpoint data file.

The breakpoint data file may be a data file for which the process lastly completes collecting the I/O information when the process is suspended, or may be a next data file following the data file for which the process lastly completes collecting the I/O information when the process is suspended. Collecting the I/O information by the process continuously based on the breakpoint data file may include collecting the I/O information of data continuously with the next data file of the breakpoint data file as a new start point (i.e., starting from the next data file), or collecting the I/O information of data continuously with the breakpoint data file as a new start point (i.e., starting from the breakpoint data file).

In the implementation, the resource in the storage node may be sensed in real time, such that the consumption of the resource by the process may be controlled. For example, a collection task is automatically suspended during a peak period of businesses, thereby implementing precedence of the businesses of the storage engine, and the consumption of the resource may be automatically adjusted according to a system resource and the system load, to eliminate or reduce influence on the businesses of the storage engine.

Alternatively, collecting the I/O information continuously by the process based on the breakpoint data file may include: collecting the I/O information continuously by the process based on the breakpoint data file when a timer expires, in which the timer is started when the process is suspended.

In the implementation, the timer is enabled when the process is suspended. When the timer expires, the process collects the I/O information continuously. In this way, the influence on the storage engine during the peak period of the businesses may be avoided in time, and collection of the I/O information may be automatically resumed.

Description for the above implementation will be made below with reference to FIG. 2.

A resource monitoring module monitors and records usage information of the CPU, the memory, the disk I/O, the disk free space, the network card bandwidth, the system load or the like. When the variation of a certain monitoring item in one or more consecutive sampling periods exceeds the threshold, the variation is reported to a scheduling module.

The scheduling module calculates an amount of resources that need to be adjusted for the process which collects the I/O information according to the resource occupation currently received by a collection module, and sends an adjustment message to the collection module. The collection module adjusts the resources and returns an adjusted resource occupancy to the scheduling module for recording after the adjustment is completed.

The scheduling module sets a timer according to the start time. When the timer expires, a callback scheduling module sends a start command to the collection module. Then, the collection module reads a breakpoint file list, searches data to be processed, compresses and transmits the file according to its resource allocation, and then saves the breakpoint data file.

Figure 2:
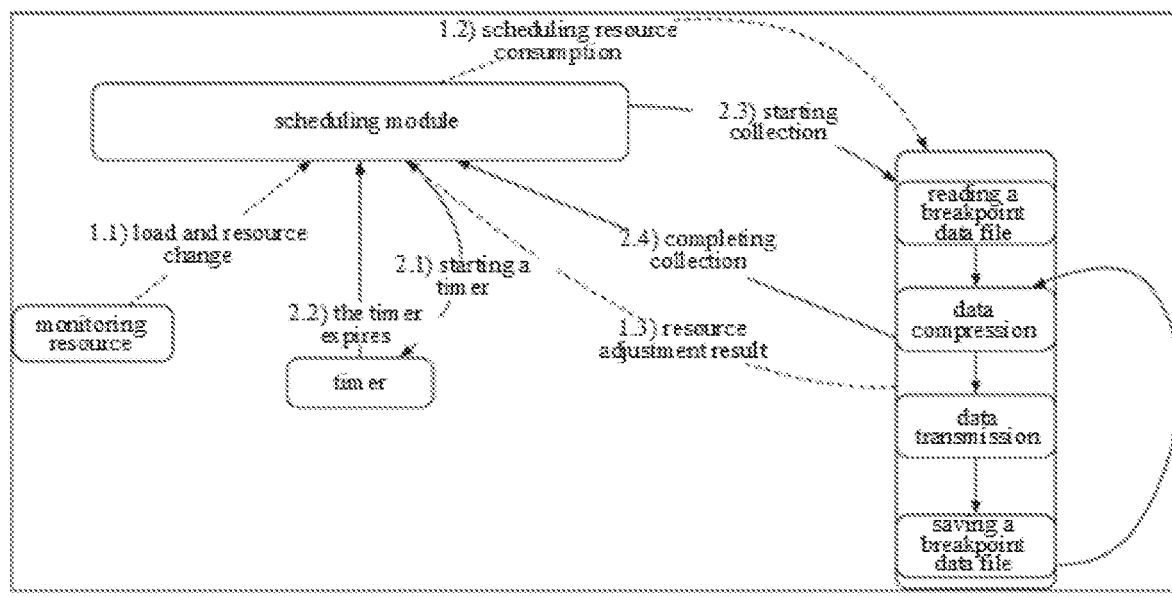
FIG. 2 is a schematic diagram illustrating collection and transmission of I/O information of data according to an embodiment of the present disclosure.

It should be noted that, all the modules illustrated in FIG. 2 are virtual modules. These modules are merely examples for illustration. An internal structure of the storage node is not limited in embodiments of the present disclosure.

At block 103, the I/O information collected by the process is sent to a target node, to enable the target node to analyze the I/O information.

The I/O information sent to the target node may be all or part of the I/O information collected by the process. The target node may be a centralized analysis node in a distributed storage system, and may be a certain storage node. When the target node is the certain storage node, the target node may perform analysis through the process independent of the storage engine.

It should be noted that, in embodiments of the present disclosure, an analysis method for the I/O information is not limited, and a corresponding analysis may be specifically performed based on an actual requirement. For example, the analysis in embodiments of the present disclosure may be: analyzing a proportion, a quantity or the like of hot data (i.e., with a high access frequency) in each storage node or the distributed storage system, may be analyzing a proportion, a quantity or the like of data for which an I/O operation is performed in sequence in each storage node or the distributed storage system, may be analyzing a proportion, a quantity or the like of data that for which an I/O operation is performed randomly in each storage node or the distributed storage system, may be analyzing a proportion, a quantity or the like of data with a shorter life period in each storage node or the distributed storage system, or may be analyzing an I/O performance or the like of each storage node or the distributed storage system. Different analysis operations may be performed based on an actual requirement.

In embodiments of the present disclosure, the process is employed to collect the I/O information and send the collected the I/O information to the target node for analysis, such that the complexity of the storage node may be reduced, a lightweight collection and analysis framework for the I/O information may be realized without bringing an extra load to the storage engine.

As an alternative implementation, sending the I/O information collected by the process to the target node includes: compressing the I/O information collected by the process into a compressed file, and sending the compressed file to the target node.

The compressed file compressed from the I/O information may be a compressed file in a compression format corresponding to the storage node. The compressed file compressed from the I/O information may be a compressed file which is compressed according to the resource allocation of the process, in which, a compression speed, a compression format or the like corresponds to the resource allocation of the process. For example, when the process is allocated with more resources, the compression is performed in a compression mode with a fast speed, or when the process is allocated the more resources, the compression is performed in a compression mode with a larger compression degree, to realize a flexible compression.

In the above implementation, a transmission overhead may be reduced and a transmission rate may be increased due to transmitting the compressed file.

It should be noted that the storage node in embodiments of the present disclosure may also be referred as a storage device, i.e., different storage nodes in the distributed storage system may be different storage devices. One storage device may also include a plurality of storage nodes, which is not limited by embodiments of the present disclosure.

In embodiments of the present disclosure, the I/O information of data in the storage engine is collected by the process independent of the storage engine in the storage node, the adjustment is performed on the process in response to monitoring that the variation in usage of the resource in the storage node exceeds the threshold, in which, the adjustment is used to decrease the resource occupancy of the process, and the I/O information collected by the process is sent to the target node, to enable the target node to analyze the I/O information. In this way, the I/O information is collected by the above process, and the collected I/O information is sent to the target node for analysis, thereby reducing the complexity of the storage node.

Figure 3:
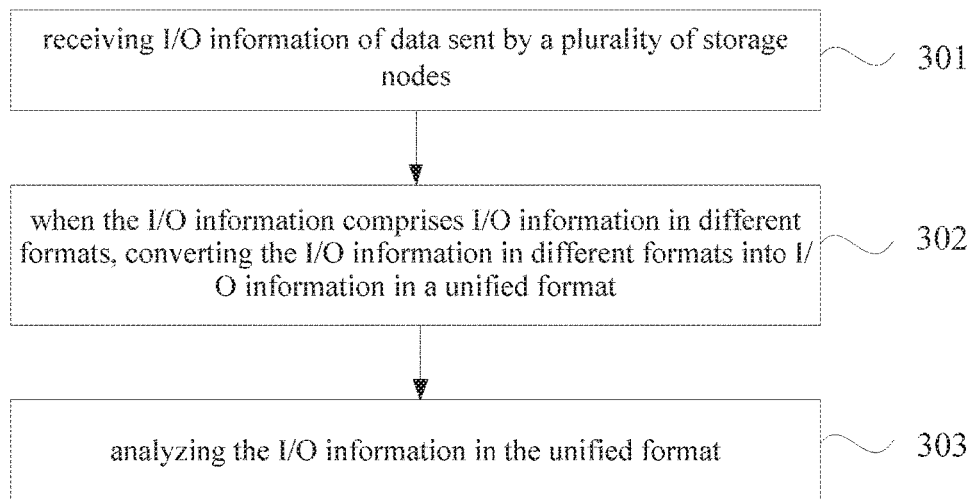
FIG. 3 is a flow chart illustrating a method for analyzing I/O information of data according to an embodiment of the present disclosure.

Referring to FIG. 3, FIG. 3 is a flow chart illustrating a method for analyzing I/O information of data according to an embodiment of the present disclosure. As illustrated in FIG. 3, the method includes the following.

At block 301, I/O information of data sent by a plurality of storage nodes is received.

It should be noted that, the method for analyzing the I/O information of data according to this embodiment may be applied to the target node in the embodiment illustrated in FIG. 1, and the I/O information of data in this embodiment may be referred to the relevant description of the embodiment illustrated in FIG. 1, which is not elaborated here.

At block 302, when the I/O information includes I/O information in different formats, the I/O information in different formats is converted into I/O information in a unified format.

The I/O information including I/O information in different formats may mean that I/O information sent by the plurality of storage nodes includes I/O information in different formats. For example, in the 10 storage nodes, 3 storage nodes send I/O information in a first format, another 3 storage nodes send I/O information in a second format, and the remaining 4 storage nodes send I/O information in a third format.

In addition, the I/O information in different formats may be I/O information in different text formats and/or I/O information in different compression formats. Further, the format of the I/O information transmitted by each storage node may also be a data format corresponding to a file storage format of the storage node.

Converting the I/O information in different formats into the I/O information in the unified format may include: converting the I/O information in different formats into I/O information in a target format. The target format may be a certain format from the above mentioned different formats of the I/O information, or may be a format other than the above mentioned different formats of the I/O information, which is not limited. Further, converting the I/O information in different formats into the I/O information in the unified format may be understood as performing normalization processing on the I/O information in different formats to obtain the I/O information in the unified format.

As an alternative implementation, when the I/O information includes the I/O information in different formats, converting the I/O information in different formats into the I/O information in the unified format includes: when the I/O information includes I/O information in a plurality of compression formats, reading the I/O information in the plurality of compression formats respectively, and converting the read I/O information into the I/O information in the unified format.

It should be noted that, the I/O information including the I/O information in the plurality of compression formats may mean that the I/O information only includes the I/O information in the plurality of compression formats, or that the I/O information includes not only the I/O information in the plurality of compression formats, but also includes the I/O information in other formats, such as the I/O information in the text format. In this case, the I/O information in the plurality of compression formats and the I/O information in other formats are converted into I/O information in the unified format.

Reading the I/O information with the plurality of compression formats respectively, and converting the read I/O information into the I/O information in the unified format may include, not decompressing I/O information in a compressed format, but performing format conversion on the I/O information in the compressed format directly during reading, thereby effectively improving performance of analysis work while reducing the disk I/O. For example, reading and converting the I/O information in the compressed format are completed in the memory, without decompressing the I/O information in the compressed format to the disk and reading the I/O information from disk for converting during the conversion, thereby reducing the disk I/O.

Figure 4:
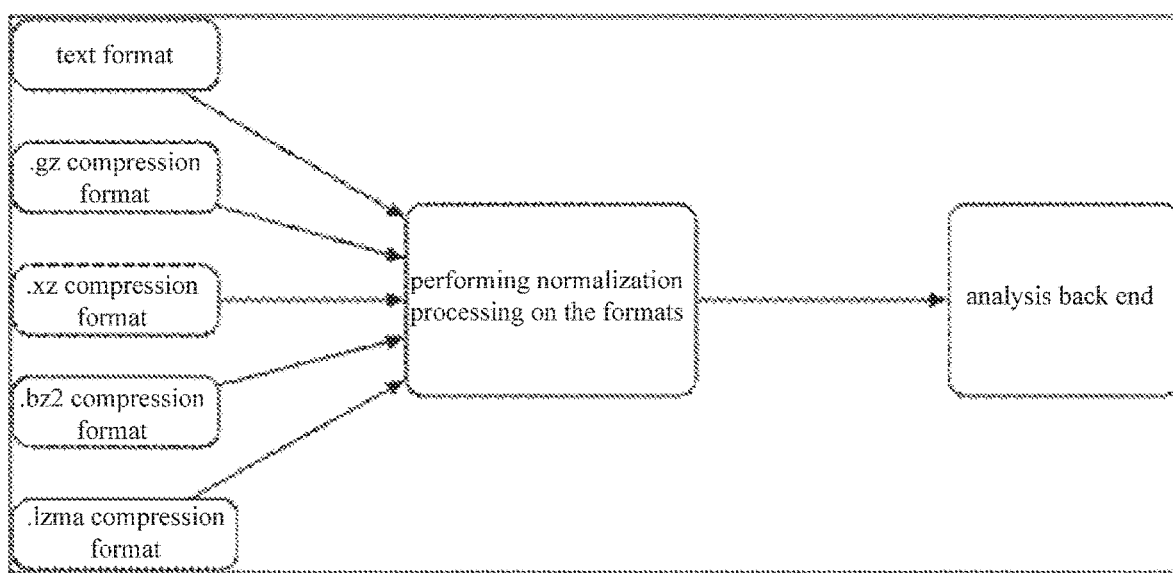
FIG. 4 is a schematic diagram illustrating an analysis of I/O information of data according to an embodiment of the present disclosure.

Taking FIG. 4 as an example, formats of the I/O information include the text format, a gz compression format, an xz compression format, a bz2 compression format and an lzma compression format. The I/O information in the unified format is obtained through performing normalization processing on the I/O information in different formats, and analyzed by an analysis back end.

In an actual application, when the I/O information is analyzed, data formats corresponding to different file storage formats are inconsistent. If special treatments are performed for respective formats, a processing logic will be very complex, thereby causing a poor scalability. In this embodiment, all file storage formats may be unified into a consistent format at an analysis front end. In this way, all file formats share the analysis back end. When a new file format is added later, the new file format only needs to be converted into the unified format at the front end, thereby ensuring a good scalability.

In addition, when the compressed file is processed, the compressed file is not decompressed, but the format is directly converted during reading the compressed file, thereby effectively improving the performance of analysis work while reducing the disk I/O.

At block 303, the I/O information in the unified format is analyzed.

It should be noted that, in embodiments of the present disclosure, an analysis method for I/O information is not limited, and a corresponding analysis may be specifically performed based on an actual requirement. For example, the analysis in embodiments of the present disclosure may be: analyzing a proportion, a quantity or the like of hot data (i.e., with a high access frequency) in each storage node or the distributed storage system, may be analyzing a proportion, a quantity or the like of data for which an I/O operation is performed in sequence in each storage node or the distributed storage system, may be analyzing a proportion, a quantity or the like of data for which an I/O operation is performed randomly in each storage node or the distributed storage system, may be analyzing a proportion, a quantity or the like of data with a shorter life period in each storage node or the distributed storage system, or may be analyzing an I/O performance or the like of each storage node or the distributed storage system. Different analysis operations may be performed based on an actual requirement.

Through the actions at the above blocks, the I/O information of the plurality of storage nodes may be uniformly analyzed by one node, thereby reducing the complexity of the storage node. In addition, the method for analyzing the I/O information of data may be executed by a certain storage node in the distributed storage system, and the process for performing the analysis may be the process independent of the storage engine. In this way, no extra load is brought to the storage engine, or the method for analyzing the I/O information of data may be performed by a non-storage node.

In embodiments of the present disclosure, the I/O information of data sent by the plurality of storage nodes is received, when the I/O information includes the I/O information in different formats, the I/O information in different formats is converted into the I/O information in the unified format; and the I/O information in the unified format is analyzed. In this way, the I/O information of the plurality of storage nodes is uniformly analyzed by one node, thus the complexity of the storage node may be reduced. In addition, as the I/O information in different formats is converted into the I/O information in the unified format, analysis differentiation caused by different formats is eliminated, and it may be prevented that the compressed file is decompressed firstly and then processed, such that the scalability and performance for analyzing the I/O information are effectively improved.

Figure 5:
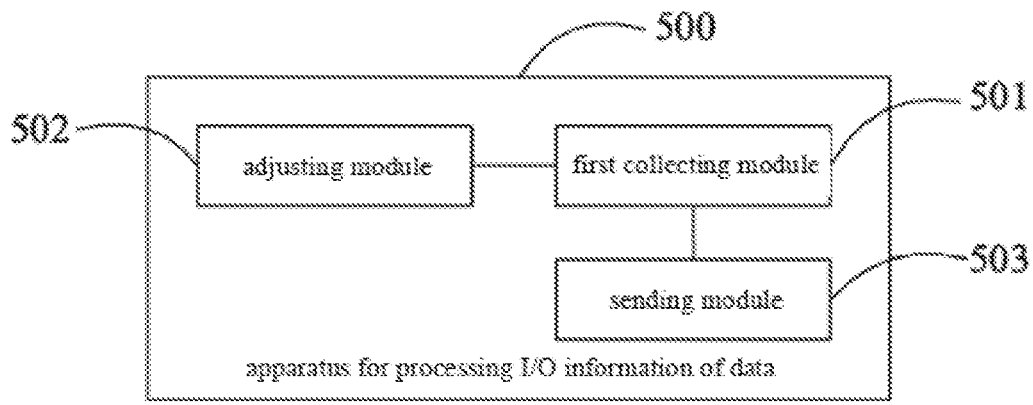
FIG. 5 is a block diagram illustrating an apparatus for processing I/O information of data according to an embodiment of the present disclosure.

Referring to FIG. 5, FIG. 5 is a block diagram illustrating an apparatus for processing I/O information of data according to an embodiment of the present disclosure. As illustrated in FIG. 5, the apparatus 500 includes: a first collecting module 501, an adjusting module 502, and a sending module 503.

The first collecting module 501 is configured to collect I/O information of data in a storage engine by a process independent of the storage engine in a storage node. The adjusting module 502 is configured to perform adjustment on the process in response to monitoring that a variation in usage of resource in the storage node exceeds a threshold, in which, the adjustment is used to decrease a resource occupancy of the process. The sending module 503 is configured to send the I/O information collected by the process to a target node, to enable the target node to analyze the I/O information.

Alternatively, the sending module 503 is configured to compress the I/O information collected by the process into a compressed file, and to send the compressed file to the target node.

Alternatively, the adjusting module 502 is configured to suspend the process in response to monitoring that the variation in usage of the resource in the storage node exceeds the threshold, and to record a breakpoint data file.

Figure 6:
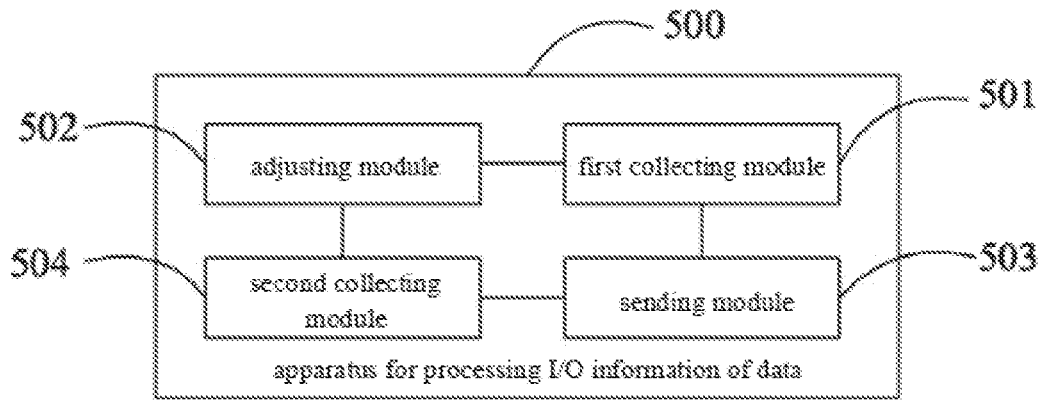
FIG. 6 is a block diagram illustrating an apparatus for processing I/O information of data according to another embodiment of the present disclosure.

As illustrated in FIG. 6, the apparatus further includes: a second collecting module 504, configured to collect the I/O information continuously by the process based on the breakpoint data file.

Alternatively, the second collecting module 504 is configured to collect the I/O information continuously by the process based on the breakpoint data file when a timer expires, in which the timer is started when the process is suspended.

It should be noted that, any implementation of the method for processing the I/O information in embodiments of the present disclosure may be implemented by the apparatus for processing the I/O information in this embodiment while achieving the same beneficial effects, which is not elaborated here.

Figure 7:
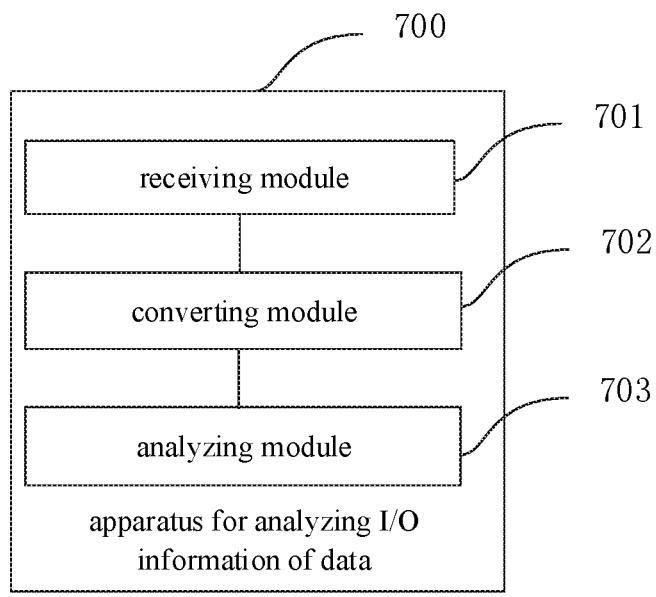
FIG. 7 is a block diagram illustrating an apparatus for analyzing I/O information of data according to an embodiment of the present disclosure.

Referring to FIG. 7, FIG. 7 is a block diagram illustrating an apparatus for analyzing I/O information of data according to an embodiment of the present disclosure. As illustrated in FIG. 7, the apparatus 700 includes: a receiving module 701, a converting module 702, and an analyzing module 703.

The receiving module 701 is configured to receive I/O information of data sent by a plurality of storage nodes. The converting module 702 is configured to, when the I/O information includes I/O information in different formats, convert the I/O information in different formats into I/O information in a unified format. The analyzing module 703 is configured to analyze the I/O information in the unified format.

Alternatively, the converting module 702 is configured to, when the I/O information includes I/O information in a plurality of compression formats, read the I/O information in the plurality of compression formats respectively, and convert the read I/O information into the I/O information in the unified format.

It should be noted that, any implementation of the method for analyzing the I/O information in embodiments of the present disclosure may be implemented by the apparatus for analyzing the I/O information in this embodiment while achieving the same beneficial effects, which is not elaborated here.

Figure 8:
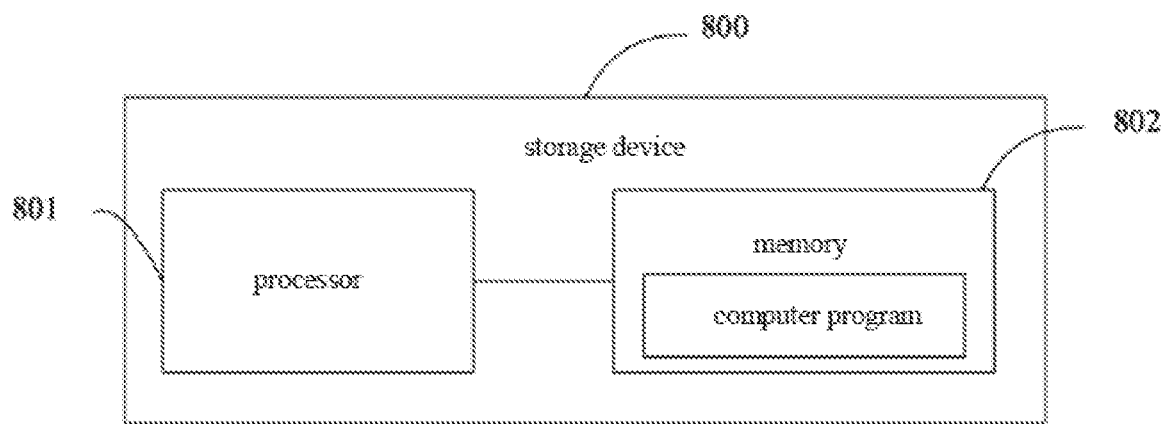
FIG. 8 is a block diagram illustrating a storage device according to an embodiment of the present disclosure.

Referring to FIG. 8, FIG. 8 is a block diagram illustrating a storage device according to an embodiment of the present disclosure. As illustrated in FIG. 8, the storage device 800 includes a processor 801, a memory 802, and a computer program stored in the memory 802 and executable by the processor.

When the computer program is executed by the processor 801, the processor is configured to: collect I/O information of data in a storage engine by a process independent of the storage engine in a storage node; perform adjustment on the process in response to monitoring that a variation in usage of resource in the storage node exceeds a threshold, in which, the adjustment is used to decrease a resource occupancy of the process; and send the I/O information collected by the process to a target node, to enable the target node to analyze the I/O information.

Alternatively, sending the I/O information collected by the process to the target node includes: compressing the I/O information collected by the process into a compressed file, and sending the compressed file to the target node.

Alternatively, performing the adjustment on the process includes: suspending the process, and recording a breakpoint data file. The method further includes: collecting the I/O information continuously by the process based on the breakpoint data file.

Alternatively, collecting the I/O information continuously by the process based on the breakpoint data file includes: collecting the I/O information continuously by the process based on the breakpoint data file when a timer expires, in which, the timer is started when the process is suspended.

It should be noted that, the storage device in this embodiment may be referred to as the storage node.

The storage device according to embodiments of the present disclosure may implement each process in the storage device in embodiments of the method illustrated in FIG. 1, and may achieve the same beneficial effect, which is not be elaborated here in order to avoid repetition.

Figure 9:
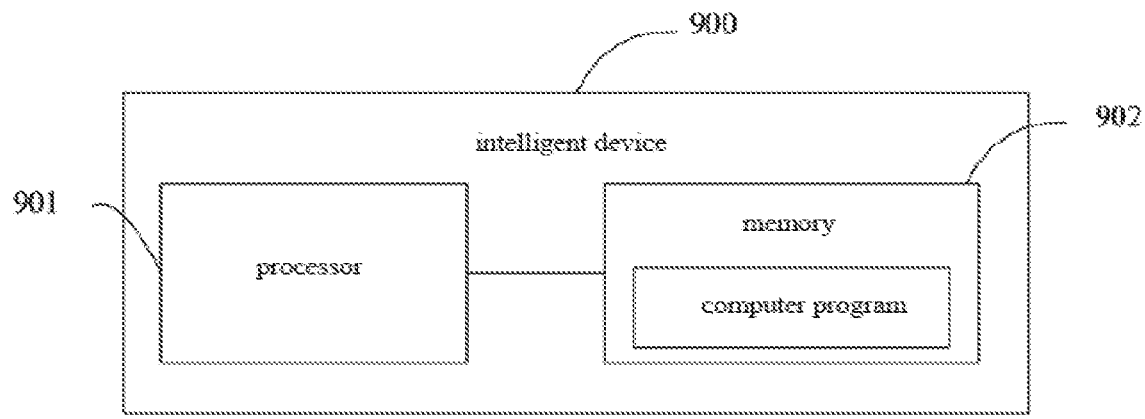
FIG. 9 is a block diagram illustrating an intelligent device according to an embodiment of the present disclosure.

Referring to FIG. 9, FIG. 9 is a block diagram illustrating an intelligent device according to an embodiment of the present disclosure. As illustrate in FIG. 9, the intelligent device includes a processor 801, a memory 802, and a computer program stored in the memory 802 and executable by the processor.

When the computer program is executed by the processor 801, the processor is configured to: receive I/O information of data sent by a plurality of storage nodes; when the I/O information includes I/O information in different formats, convert the I/O information in different formats into I/O information in a unified format; and analyze the I/O information in the unified format.

Alternatively, when the I/O information includes the I/O information in different formats, converting the I/O information in different formats into the I/O information in the unified format includes: when the I/O information includes I/O information in a plurality of compression formats, reading the I/O information in the plurality of compression formats respectively, and converting the read I/O information into the I/O information in the unified format.

It should be noted that, the intelligent device in this embodiment may be the storage node in the distributed storage system, or may be other intelligent device, such as a computer, etc.

The intelligent device according to embodiments of the present disclosure may implement each process in the intelligent device in embodiments of the method illustrated in FIG. 3, and may achieve the same beneficial effect, which is not be elaborated here in order to avoid repetition.

Embodiments of the present disclosure provide a computer readable medium having a computer program stored thereon. When the computer program is executed by the processor, the method for processing I/O information according to embodiments of the present disclosure is implemented, or the method for analyzing I/O information according to embodiments of the present disclosure is implemented.

It should be noted that, in the description, the terms "comprising", "including" or any other variation thereof are intended to cover a non-exclusive inclusion, such that a process, method, article, or apparatus that includes a list of elements not only includes those elements, but also includes other elements not expressly listed, or elements inherent to such process, method, article, or apparatus. Without further restrictions, an element defined by a sentence "includes an/a . . . " does not exclude the presence of another identical element in the process, method, article, or apparatus that includes the element.

From the description for the above implementations, the skilled in the art may clearly understand that the above embodiments of the method may be implemented by means of software and a necessary general-purpose hardware platform, or implemented by means of hardware. In some cases, the former is a better embodiment. Based on this understanding, the technical solution of the present disclosure in essence and the part that contributes to the prior art may be embodied in the form of a software product. The computer software product is stored in a storage medium (such as a ROM/RAM, magnetic disk, optical disk) and includes several instructions for causing a terminal (which may be a mobile phone, a computer, a server, or a network device, etc.) to perform the methods described in various embodiments of the present disclosure.

Embodiments of the present disclosure are described above with reference to the accompanying drawings, but the present disclosure is not limited to the specific implementation described above. The specific implementation described above is merely illustrative and not restrictive. The skilled in the art may make a plurality of forms under the inspiration of the present disclosure without departing from the protection scope of the purposes and claims of the present disclosure. The plurality of forms should fall within the protection scope of the present disclosure.

What is claimed is:

1. A method for processing I/O information of data, comprising:
    collecting I/O information of data in a storage engine by a process independent of the storage engine in a storage node;
    performing adjustment on the process in response to monitoring that a variation in usage of resource in the storage node exceeds a threshold, wherein the adjustment is used to decrease a resource occupancy of the process; and
    sending the I/O information collected by the process to a target node, to enable the target node to analyze the I/O information.

2. The method of claim 1, wherein sending the I/O information collected by the process to the target node comprises:
    compressing the I/O information collected by the process into a compressed file, and sending the compressed file to the target node.

3. The method of claim 1, wherein performing the adjustment on the process comprises:
    suspending the process, and recording a breakpoint data file; and
    the method further comprises:
    collecting the I/O information continuously by the process based on the breakpoint data file.

4. The method of claim 3, wherein collecting the I/O information continuously by the process based on the breakpoint data file comprises:
    collecting the I/O information continuously by the process starting from the breakpoint data file or starting from a next data file of the breakpoint data file.

5. The method of claim 3, wherein collecting the I/O information continuously by the process based on the breakpoint data file comprises:
    collecting the I/O information continuously by the process based on the breakpoint data file when a timer expires, in which, the timer is started when the process is suspended.

6. The method of claim 1, wherein the I/O information of data comprises at least one of an access mode, an access heat and a lift period of the data.

7. The method of claim 2, wherein compressing the I/O information collected by the process into the compressed file comprises:

compressing the I/O information collected by the process into the compressed file in a compression format corresponding to the storage node.

8. The method of claim 2, wherein compressing the I/O information collected by the process into the compressed file comprises:
compressing the I/O information collected by the process into the compressed file with a compression format or a compression speed corresponding to resource allocation of the process.

9. A storage device, comprising:
a processor;
a memory; and
a computer program stored in the memory and executable by the processor, wherein, when the computer program is executed by the processor, the processor is caused to perform the method for processing I/O information of data comprising:
collecting I/O information of data in a storage engine by a process independent of the storage engine in a storage node;
performing adjustment on the process in response to monitoring that a variation in usage of resource in the storage node exceeds a threshold, wherein the adjustment is used to decrease a resource occupancy of the process; and
sending the I/O information collected by the process to a target node, to enable the target node to analyze the I/O information.

10. The storage device of claim 9, wherein sending the I/O information collected by the process to the target node comprises:
compressing the I/O information collected by the process into a compressed file, and sending the compressed file to the target node.

11. The storage device of claim 9, wherein performing the adjustment on the process comprises:
suspending the process, and recording a breakpoint data file; and
the method further comprises:
collecting the I/O information continuously by the process based on the breakpoint data file.

12. The storage device of claim 11, wherein collecting the I/O information continuously by the process based on the breakpoint data file comprises:
collecting the I/O information continuously by the process starting from the breakpoint data file or starting from a next data file of the breakpoint data file.

13. The method of claim 11, wherein collecting the I/O information continuously by the process based on the breakpoint data file comprises:
collecting the I/O information continuously by the process based on the breakpoint data file when a timer expires, in which, the timer is started when the process is suspended.

14. The storage device of claim 9, wherein the I/O information of data comprises at least one of an access mode, an access heat and a lift period of the data.

15. The storage device of claim 10, wherein compressing the I/O information collected by the process into the compressed file comprises:
compressing the I/O information collected by the process into the compressed file in a compression format corresponding to the storage node.

16. The storage device of claim 10, wherein compressing the I/O information collected by the process into the compressed file comprises:
compressing the I/O information collected by the process into the compressed file with a compression format or a compression speed corresponding to resource allocation of the process.

* * * * *